C. WILLERS.
SIGNAL.
APPLICATION FILED MAY 1, 1916.
1,224,695.
Patented May 1, 1917.
2 SHEETS—SHEET 1.
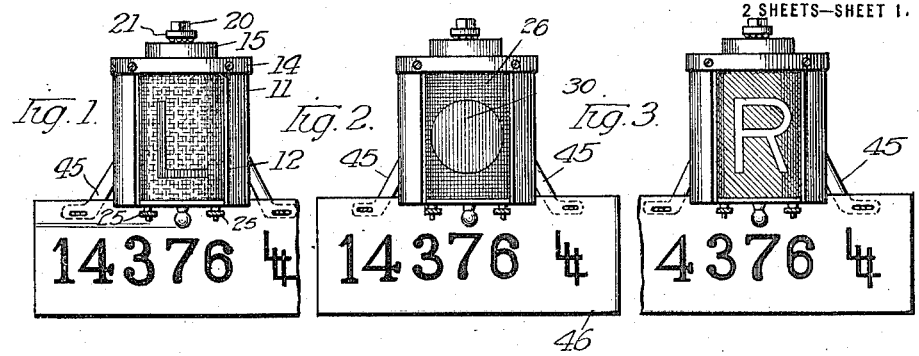
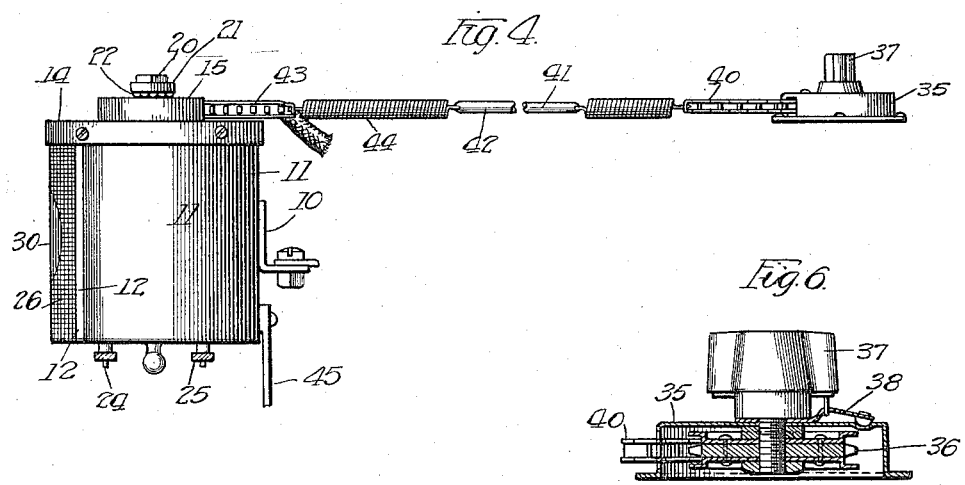
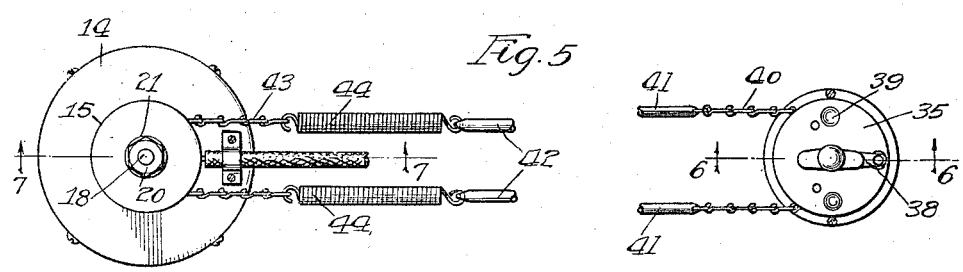
Inventor
Carl Willers
By Casper L. Redfield Atty.

C. WILLERS.
SIGNAL.
APPLICATION FILED MAY 1, 1916.
1,224,695.
Patented May 1, 1917.
2 SHEETS—SHEET 2.
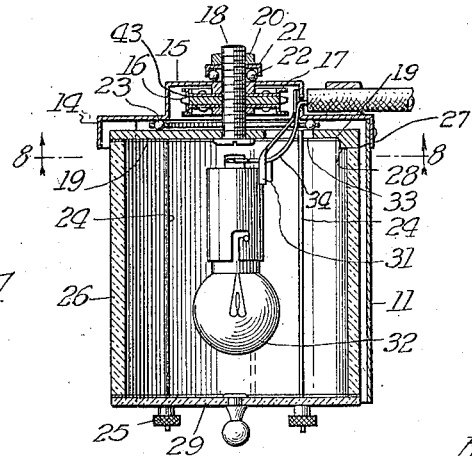
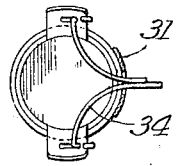
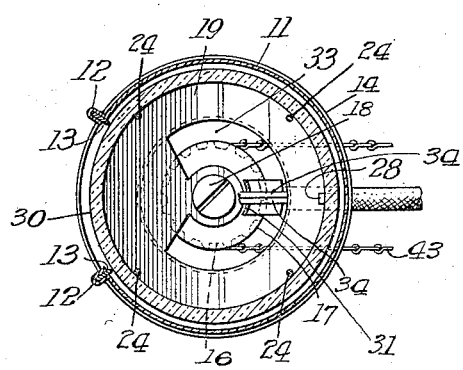
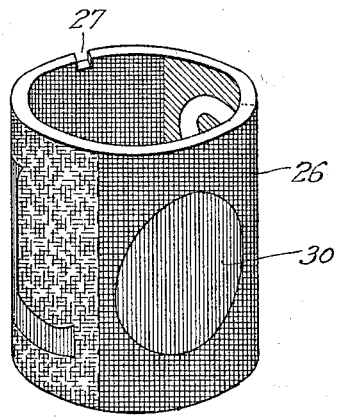
Inventor
Carl Willers
By Casper L. Redfield Atty.

UNITED STATES PATENT OFFICE.

CARL WILLERS, OF CHICAGO, ILLINOIS.

SIGNAL.

1,224,695.  Specification of Letters Patent.  Patented May 1, 1917.

Application filed May 1, 1916. Serial No. 94,570.

*To all whom it may concern:*

Be it known that I, CARL WILLERS, a subject of the King of Sweden, and a resident of the city of Chicago, county of Cook, and State of Illinois, have invented certain new and useful Improvements in Signals, of which the following is a specification.

My invention relates to signals, and is particularly applicable as a tail-light signal for automobiles. The object is to provide an improved form of such device.

In the accompanying drawings

Figures 1, 2 and 3 are elevations of the signal showing it in three positions;

Fig. 4 is a side elevation, at a larger scale, and showing the connections to the shifting button or lever at the driver's seat;

Fig. 5 is a plan of Fig. 4;

Fig. 6 is an enlarged section on line 6—6 of Fig. 5;

Fig. 7 is a still more enlarged section on line 7—7 of Fig. 5;

Fig. 8 is a section on line 8—8 of Fig. 7; and

Figs. 9 and 10 are details.

Secured to a convenient bracket 10 (Fig. 4) is a cylindrical casing 11 which extends through about three-quarters of a circumference, and has its edges terminating in loops 12 which hold pieces of rubber 13 (Fig. 8). The upper end of the casing 11 is closed by a cap 14 having the central part 15 in the form of a pocket adapted to receive a sprocket wheel 16 held by rivets between two formed disks 17. A bolt or pin 18 secures a disk 19 to the wheel 16. A nut 20, cup 21 and balls 22 furnish an anti-friction bearing over the top of pocket 15. Other balls 23 furnish an anti-friction bearing between cap 14 and disk 19.

Secured in the under face of the disk 19 are bolts or studs 24 provided with nuts 25. Inside of the casing 11, and free therefrom, is a glass cylinder 26 which is centrally located by contact with bolts 24, and which has a notch 27 engaging a lug 28 on the disk 19. Under the cylinder 26 is a glass disk 29; the bolts 24 and nuts 25 serving to clamp the cylinder 26 and disk 29 to the disk 19.

The glass cylinder 26 is divided into three or four parts having different designations, and each part covering a circumferential space substantially equal to the space between the loops 12 on the casing 13. Thus, for automobile use, one part may be a red bull's-eye 30, a second may be the character L of any desired color on a different colored background, and a third may be the character R of any color on any background.

Secured to the cap 14 by a bracket 31 is a lamp 32 supported in the space inclosed by the cylinder 26 and disks 19 and 29. The bracket 31 passes through an opening 33 in the disk 19, said opening being elongated so that disk 19 may turn without striking the bracket. The electrical connections 34 for the lamp also pass through this opening.

At some convenient place near the driver's seat is a housing 35 in which is a sprocket wheel 36 like the sprocket 16 before described. Secured to the sprocket 36 is a button or lever 37 provided with a spring arm 38 adapted to engage depressions 39 in the top of housing 35. By turning the button 37, the wheel 36 will also be turned, arm 38 and depression 39 serving as normal stopping places for the wheel 36.

Moved by the wheel 36 is a chain 40 connected to rods 41, but when the lever or button 37 is a considerable distance from the signal apparatus, and not in direct line with it, there will be interposed sections of chain or wire rope running over guide pulleys in the ordinary manner. For my present purposes, rods 41 and 42 are considered as the ends of connections which are either rigid or flexible as conditions may require.

Mounted on the sprocket 16 is a chain 43, and interposed between the ends of this chain and rods 42 are springs 44. These springs yield to prevent breakage in case some part sticks or is caught for any reason.

It will be evident that by turning the button 37, the interposed connection will cause a corresponding turning of the glass 26. The parts are presumed to be so set that when the button 37 is in the position shown in Fig. 5, the red spot 30 will be exhibited through the open part of casing 11. When the button is turned in one direction from this central position the character L will be exposed, while turning it in the other direction will expose the character R.

Secured to the back of the casing 11 are arms 45 for supporting the license tag 46. The glass 29 closing the bottom of the cylinder 26 permits light from the lamp 32 to fall on the face of the tag. The pieces of rubber 13 come in contact with the outer face of the cylinder 26 and serve to clean it each time the cylinder is moved to show a different signal.

What I claim is:

1. In a signal, a casing having one end open and the other end closed and having a window in one side, a designating cylinder pivotally supported from the center of the closed end of the casing, a lamp supported within said cylinder and arranged to project light through said window and through the open end of said casing, and means for turning said cylinder on its pivot.

2. In a signal, a casing having an opening for light on one side, a cap closing the upper end of said casing, the lower end of the casing being open and unobstructed for the passage of light, a designating cylinder pivotally supported on said cap and within the casing, a lamp secured to the cap and supported within the cylinder below the pivot, said lamp being arranged to project light through the open side and bottom of the casing, and means controlled from the outside of the casing for turning the cylinder on its pivot to interpose different designations between the light and the open side of the casing.

3. In a signal, a cylindrical casing having its upper end closed and its lower end open and unobstructed, a designating cylinder located within the casing and pivotally supported from the closed end thereof, a driving connection located within the casing and secured to the pivotal support, and a lamp located within the cylinder.

4. In a signal, a cylindrical casing, a cap closing the upper end of the casing, a transparent cylinder located within the casing, covers closing the ends of said cylinder, the lower one of said covers being of transparent material, a pivotal connection between the cap and the upper cover of said cylinder by means of which connection the cylinder is supported and rotated within the casing, and a lamp supported within the cylinder, the support for said lamp being connected to said cap and extending through a slot in the upper cover for the cylinder.

CARL WILLERS.

Copies of this patent may be obtained for five cents each, by addressing the "Commissioner of Patents, Washington, D. C."